(12) United States Patent
Marman (10) Patent No.: US 7,504,942 B2
(45) Date of Patent: Mar. 17, 2009

(54) LOCAL VERIFICATION SYSTEMS AND METHODS FOR SECURITY MONITORING

(75) Inventor: Douglas H. Marman, Ridgefield, WA (US)

(73) Assignee: VideoIQ, Inc., Bedford, MA (US)

( * ) Notice: Subject to any disclaimer, the term of this patent is extended or adjusted under 35 U.S.C. 154(b) by 255 days.

(21) Appl. No.: 11/348,633

(22) Filed: Feb. 6, 2006

(65) Prior Publication Data

US 2007/0182540 A1    Aug. 9, 2007

(51) Int. Cl.
G08B 13/00 (2006.01)

(52) U.S. Cl. .................. 340/541; 348/152; 348/161; 382/118

(58) Field of Classification Search .......... 340/541; 348/152–156, 161; 382/103, 115, 118
See application file for complete search history.

(56) References Cited

U.S. PATENT DOCUMENTS

| | | | |
|---|---|---|---|
| 4,161,750 A | 7/1979 | Kamin | |
| 4,257,063 A | 3/1981 | Loughry et al. | |
| 4,679,077 A * | 7/1987 | Yuasa et al. | 348/154 |
| 5,091,780 A * | 2/1992 | Pomerleau | 348/152 |
| 5,289,275 A | 2/1994 | Ishii et al. | |
| 5,715,325 A * | 2/1998 | Bang et al. | 382/118 |
| 5,838,839 A | 11/1998 | Seki et al. | |
| 5,847,755 A | 12/1998 | Wixson et al. | |
| 5,870,471 A | 2/1999 | Wootton et al. | |
| 5,937,092 A | 8/1999 | Wootton et al. | |
| 5,956,424 A | 9/1999 | Wootton et al. | |
| 6,069,655 A | 5/2000 | Seeley et al. | |
| 6,081,606 A | 6/2000 | Hansen et al. | |
| 6,091,771 A | 7/2000 | Seeley et al. | |
| 6,097,429 A | 8/2000 | Seeley et al. | |
| 6,104,831 A | 8/2000 | Ruland | |
| 6,317,152 B1 | 11/2001 | Hobson et al. | |
| 6,392,704 B1 | 5/2002 | Garcia-Ortiz | |
| 6,411,209 B1 | 6/2002 | Lyons et al. | |
| 6,618,074 B1 | 9/2003 | Seeley et al. | |
| 6,700,487 B2 | 3/2004 | Lyons et al. | |
| 6,744,462 B2 | 6/2004 | Gutta et al. | |

(Continued)

OTHER PUBLICATIONS

"Sarnoff Video Detection & Tracking, Video Technologies," Sarnoff Corporation, 1999.

(Continued)

Primary Examiner—Thomas J Mullen
(74) Attorney, Agent, or Firm—Stoel Rives LLP (57) ABSTRACT

A security monitoring system for reducing the number of false alarms through verification comprises a remote system at a first location remote from a second location and a local system located at the second location. The remote system comprises a remote database. The local system is electronically linked with the remote system to provide indication of alarm events to the remote system and comprises at least one camera operable to capture at least one image of a local object in view of the camera, a local database operable to electronically store at least one template corresponding to an authorized object, and an image processing system operable to perform a visual verification. The visual verification comprises comparing the at least one image of the local object with the at least one template corresponding to the authorized object and, if a matching result occurs from the visual verification, suppressing indication of an alarm event to the remote system.

47 Claims, 2 Drawing Sheets

U.S. PATENT DOCUMENTS

| | | | |
|---|---|---|---|
| 7,176,440 B2* | 2/2007 | Cofer et al. | 340/541 |
| 2002/0070858 A1 | 6/2002 | Gutta et al. | |
| 2002/0071032 A1 | 6/2002 | Lyons et al. | |
| 2005/0002572 A1 | 1/2005 | Saptharishi et al. | |
| 2005/0198063 A1* | 9/2005 | Thomas et al. | 707/102 |

OTHER PUBLICATIONS

Bodor et al., "Vision-based human tracking and activity recognition," in *Proc. of the 11th Mediterranean Conf. on Control and Automation*, Jun. 2003.

Niu et al., "Human Activity Detection and Recognition for Video Surveillance," *Proceedings of the IEEE Multimedia and Expo Conference*, Taipei, Taiwan, 2004.

Mahalanobis et al., "Network video image processing for security, surveillance, and situational awareness," Enabling Photonic Technologies for Aerospace Applications VI. Edited by Pirich, Andrew R.; Hayduk, Michael J.; Donkor, Eric. Proceedings of the SPIE, vol. 5440, pp. 1-8 (2004).

* cited by examiner

FIG. 2

LOCAL VERIFICATION SYSTEMS AND METHODS FOR SECURITY MONITORING

FIELD

The disclosed technology relates to methods and systems regarding security monitoring and alarm system technology.

BACKGROUND

For years, security systems have employed video cameras and video processors that can perform some type of motion detection by watching for motion in a scene, generally by looking at differences between a current video frame and a previous video frame. If motion or motion exceeding a predetermined threshold is detected, an event is recognized. This event could create an alarm condition or trigger other actions, such as speeding up the capturing of images from the associated camera or storing captured images at a higher resolution or faster frame rate. Some security systems can be configured to distinguish different portions of the scene such that motion in some portions is considered more important than in other portions.

False alarms have become a significant drain on resources for police departments. More than 90% of all alarms sent to central alarm monitoring stations are false alarms. Moreover, more than 90% of all alarms sent to police departments are false alarms, and a significant portion of these false alarms were first screened by central alarm monitoring stations.

Some existing systems have video cameras mounted at both entries and exits to capture images of people entering and leaving the premises. Some of these systems or other systems may require that a camera be mounted on a door itself along with some type of sensor such as a doorknob sensor.

Current systems that have some type of visual verification do not perform any type of recognition at the premises but, rather, send video images to a remote central monitoring station for verification of alarms.

Certain existing alarm systems have motion detection techniques that involve the direct comparison of frames to detect motion and classify detected objects in the scene. In some of these systems, an alarm is only sent if the object is determined to be a human. Screening video based simply on whether detected motion is based on a certain class of objects (e.g., screening for humans) does not significantly reduce false alarms, if at all, because nearly all false alarms are caused by humans.

SUMMARY

Described herein are exemplary methods and systems for performing local verification in security monitoring applications. One advantage of using the described local verification approach is a reduced number of false alarms. Another advantage is the increased efficiency that comes with a system that performs verification on the premises before sending any information to a central monitoring station. The suppression of image information (e.g., video) to be transmitted for remote viewing in situations where such video need not be viewed by a third party (e.g., when an event is false) provides system users (e.g., homeowners) with the additional advantage of privacy.

In one embodiment, a security monitoring system includes a remote system and a local system, the local system being located at the premises being monitored. The local system includes cameras or other image capture devices to capture images of objects (e.g., video), a database that stores image templates corresponding to humans that are authorized to be on the premises, and a video processing system that can determine whether the object is human and, if so, can perform a visual verification by comparing the captured images with the image templates stored in the database. If a positive match occurs, then the object is deemed a human authorized to be on the premises and any alarm event indication is suppressed. If there is no positive match, however, or if no comparison can be made, a prioritization level is determined and transmitted along with the video clip to the remote system for further analysis. The remote system includes an image database that stores images of people authorized to be on the premises such that the image templates used by the local system do not need to be transmitted to the remote system.

In another embodiment, a method of reducing false alarms in a security monitoring system monitoring a location remote from a central monitoring system, where a communications link exists between the two systems, includes detecting a conditional alarm-generating event based on presence of an object at a premises associated with the monitored location. The exemplary method also includes capturing image data corresponding to the object and determining at the monitored location whether the object is authorized, based on a comparison between the captured image data and electronically stored templates. If a positive match results from the comparison, an alarm event notification to a remote system is suppressed.

In yet another embodiment, a verification module of a local component of a security system configured to communicate with a remote component includes an electronic circuit with a processor operable to perform a verification based on a comparison of at least one image of a monitored local scene and stored reference data. The verification module determines autonomously whether to indicate an alarm event. Based on the comparison results, if the image is determined not to match the reference data, an alarm event is recognized and the local component communicates the alarm event to the remote component. If the at least one image is determined to match the reference data, however, an alarm event is not recognized and no alarm event communication to the remote component occurs.

The foregoing and other features and advantages will become more apparent from the following detailed description, which proceeds with reference to the accompanying figures.

DETAILED DESCRIPTION

Described below are embodiments of a security system and methods in which visual verification of events occurring at a monitored scene at a first location takes place prior to triggering an alarm event at a remote system at a second location. In described embodiments, the visual verification is accomplished using electronic video surveillance equipment. In described embodiments, the visual verification can be configured to take place autonomously without active participation by operators at the first location or second location. In described embodiments, the verification typically involves the use of image information, e.g., visual information such as video, although other types of information (e.g., audio information) can also be used. In some embodiments, the image information can be infrared image information.

If visual verification of an event at a monitored scene is initiated, possibly in response to a sensed condition, the system evaluates whether the monitored scene exhibits characteristics of an alarm event, e.g., the system can evaluate scene changes. In described embodiments, the system evaluates whether object(s) in the monitored scene correspond to or are sufficiently similar to authorized objects (e.g., persons and/or pets authorized to be present at the first location).

This evaluation includes comparison with stored representations of such authorized objects, e.g., templates. If the comparison shows that the object(s) correspond to or are sufficiently similar to authorized objects, and thus the object(s) is considered authorized, no alarm event is triggered. If, however, the visual verification fails or is inconclusive, the remote system can communicate an alarm event indication to the remote system.

In some embodiments, the remote system subjects the alarm event conditions at the first location to further review or validation, such as, e.g., by an operator. Conveniently, the local system can be configured to provide one or more images and/or other information (e.g., the closest templates) to assist in validating the alarm event. Thus, many false alarms initiated by authorized objects can be addressed before involving the remote system. In addition, some alarm events are communicated quickly and more accurately because additional alarm event conditions information (e.g., video clips, closest match-ups, etc.) can be provided.

Figure 1:
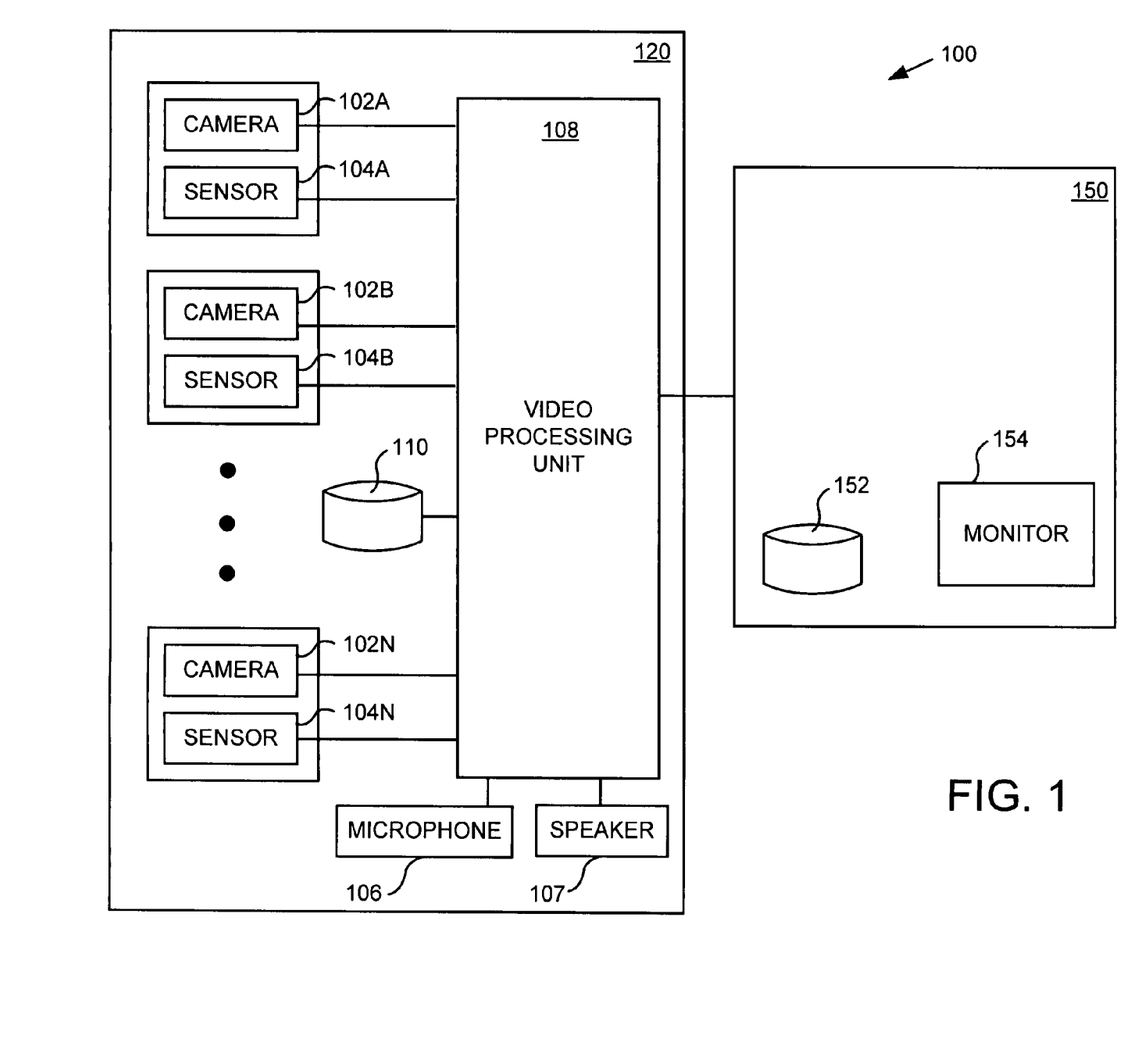
FIG. 1 is a block diagram illustrating an exemplary security system with a local system configured for visual verification linked to a remote system.

FIG. 1 illustrates an exemplary embodiment of an automated visual verification security monitoring system 100. The system 100 includes two exemplary sub-systems: a local system 120 (e.g., at a monitored premises) and a remote system 150 (e.g., at a central monitoring facility). The monitored premises can be, for example, a building (e.g., a home, commercial building, other type of structure, etc.) or other type of premises where verifying alarms is of interest.

The local system 120 has multiple cameras 102A-102N, multiple alarm Sensors 104A-104N, an optional microphone 106 and speaker 107, and an image processing unit, such as a video processing unit 108. Image-capturing devices other than cameras can be used in place of, or in addition to, the cameras 102A-102N.

The alarm sensors 104A-104N can be, for example, typical motion detectors or door and window sensors. In this example, the sensors 104A-104N are motion sensors that are each mounted with the cameras 102A-102N, respectively, in pairs. Each camera/sensor pair can be mounted in a single housing to facilitate and expedite the processing of video images from a particular camera upon the detection of motion by the corresponding sensor. The number of cameras and/or sensors, as well as their arrangement within a system, however, can all vary greatly.

In certain embodiments of the disclosed technology, cameras can be mounted either just inside or just outside doors to the premises (e.g., a home). In arrangements where the cameras are mounted inside the doorway, they are typically aimed at the door itself to capture images of people's faces upon entry through the doorway. In arrangements where the cameras are mounted outside the doorway, they are typically mounted near the doorbell to capture images of the faces of those approaching the door. These cameras can also see people leaving through the doorway though their faces might not be in full view. Cameras mounted near the doorbell also generally provide for easier wiring of power and communication lines to the cameras. It is desirable that the cameras have a wide dynamic range so that they can provide good images for the video processing unit 108 even if there is a bright light behind a person approaching a door if the camera is on the outside or, if the camera is on the inside, when the door opens.

The cameras do not need to be mounted both inside and outside a door because, for example, the video recognition system described herein can recognize people by their appearance and not just their faces. For example, the local system 120 of FIG. 1 can have stored representations of authorized objects, e.g., an image template database 110 that stores image templates that can be used to recognize people that are authorized to be on the premises. Such image templates can be created, for example, by the local system 120 itself or through a manual enrollment process (e.g., at a commercial location). The video processing unit 108 can determine most likely matches by comparing captured images of the person in question with the image templates stored in the image template database 110.

The cameras do not need to be mounted on a door itself. This is advantageous because providing electrical power for a camera at the location of the door is usually difficult.

The local system 120 can be configured to begin processing of video images after the occurrence of a sensed condition (e.g., upon the tripping of a door or window sensor). In other embodiments, a camera itself can recognize motion or the opening and/or closing of windows and doors by itself without external sensors. In other embodiments, processing of video images occurs regardless of any sensed conditions.

Figure 2:
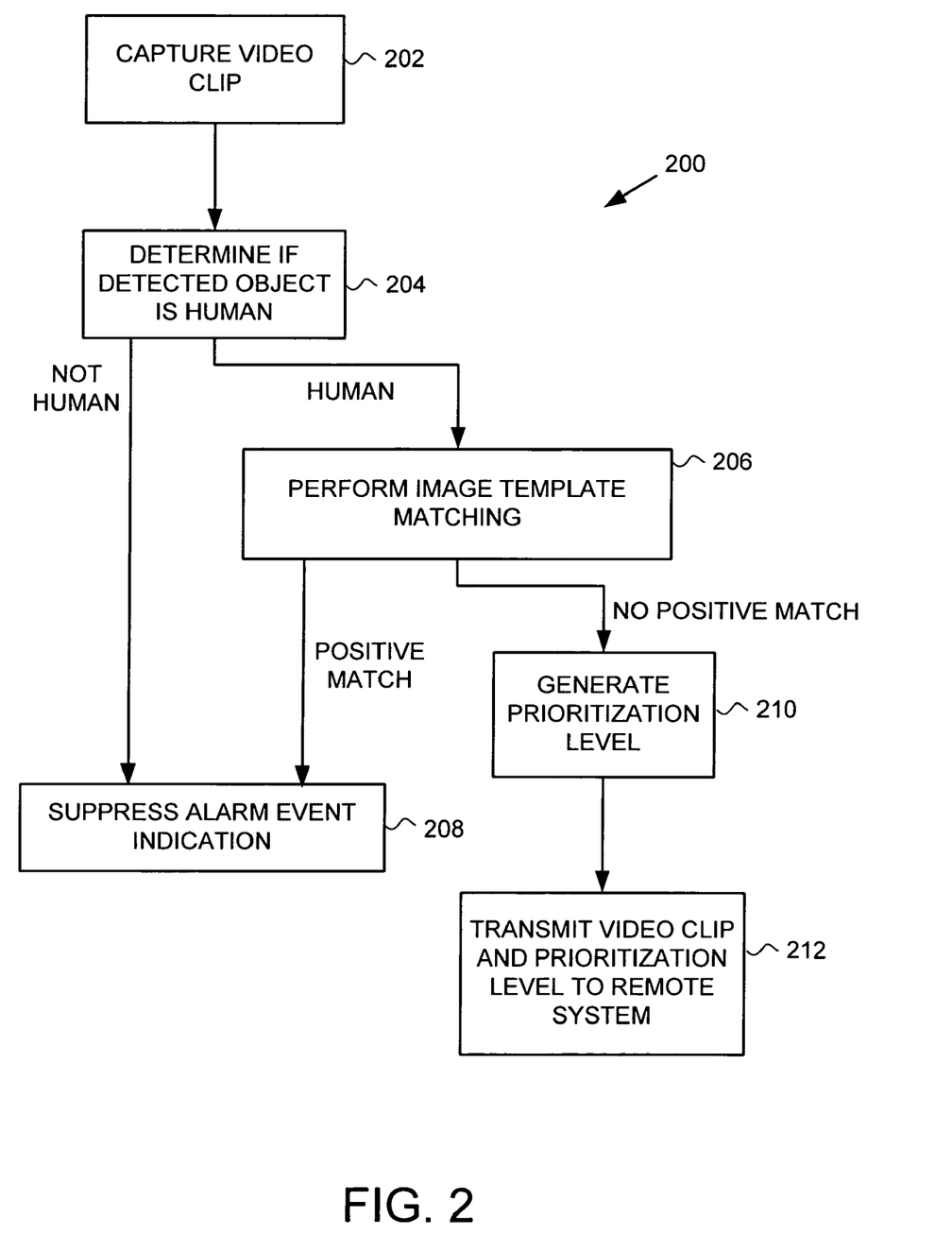
FIG. 2 is a flowchart illustrating an exemplary method for performing visual verification within a security monitoring system.

FIG. 2 illustrates an exemplary method for performing visual verification within a security monitoring system, such as the system 100 of FIG. 1. At 202, a video clip of an object (e.g., a possible intruder on the premises) is captured, such as by one or more of the cameras 102A-102N. The image clip comprises multiple images of the object that may include a series of images taken in a defined interval or a series of sequential images. At 204, an analysis is performed to determine whether the object is human. If so, the system then performs a visual verification that includes comparing an image template corresponding to the object in the captured video clip with stored image templates, as shown at 206. If not, the system suppresses an alarm event notification, as shown at 208.

If a positive match is found at 206, the object has been identified as a human considered to be authorized, so any alarm event indication is suppressed. A positive match does not require an identical match but is understood to include a reasonable match, which can be set according to the specific operating characteristics. In some embodiments, a threshold can be set for determination of whether a match should be considered positive. If no match is found, however, or if the system is unsure, an alarm event is recognized. The multiple images in an image clip may show one or more of a scene before an alarm event, a scene during an alarm event, or a scene after an alarm event. According to one approach, a prioritization level is generated, as shown at 210.

The prioritization level is transmitted with the captured video clip from the local system to the remote system, as shown at 212, such that an operator at a central monitoring facility, for example, can analyze the video clip to determine whether the alarm event is valid. If an object is unable to be subjected to a comparison (e.g., there are no templates corresponding to the object's type), a potential alarm event can be indicated to the remote system. In such a situation, review by security personnel would usually be desirable.

The video processing unit 108 of FIG. 1 can include various modules, such as those described in U.S. Pub. No. US 2005/0002572 A1 to Saptharishi et al., filed Jul. 1, 2004, which is hereby incorporated by reference. For example, a foreground/background separation module can receive an input signal and, according to one or more adaptable parameters, produce as output foreground/background labels designating elements of the input as either foreground or background elements. A foreground object grouping module can identify groups of selected foreground-labeled elements as foreground objects. An object classification module can generate object-level information related to the foreground object. The object-level information can adapt the one or more adaptable parameters of the foreground/background separation module via a feedback connection.

The video processing unit 108 has the ability to distinguish humans from other forms of video motion, such as animals, changes in lighting, headlights, balloons floating in the air, and trees blowing in the wind. The video processing unit 108 can also distinguish one human from another by visual features such as hair color, height, clothing, etc. The video processing unit 108 can also use facial features commonly used in facial recognition systems.

When a person leaves through a door, the local system 120 can recognize that person by his or her features, such as clothing, hair, height, etc. If that person should re-enter the premises shortly afterward, he or she would be recognized and allowed to enter without the generation of an alarm. This eliminates another common cause of false alarms, such as when people go outside their house to get the mail or the newspaper and forget that their system is armed. Such a feature can be programmed such that anyone leaving their home is automatically allowed back in within a preset period of time. That time period could be e.g., a whole day or a much more limited time (e.g., 15 minutes).

Another advantageous feature of the disclosed technology is the ability to recognize a person more accurately with facial recognition or by other biometric features that do not change with clothing or hair style. The local system 120 can store tokens or templates of data (e.g., in the image template database 110) that represent the person's biometric features, such as facial features, for all people authorized to enter the premises. When a person is seen entering or leaving through one of the doors to the premises, their images can be reduced to a token or template by the video processing engine, which then compares it to those in the image template database 110 that correspond to authorized people. If an appropriate match is obtained, then the likelihood of an alarm is low but further verification might still be desired before the alarm is ignored. For example, the person can still be required to enter their passcode at a keypad. His or her passcode can then be compared to the image of the person authorized to use that passcode. The local system 120 can have a locking system that only opens with the proper access control card being presented to a reader. This could also identify the person opening the door. Therefore, the facial recognition might only verify the person entering, or it might be used as the only means of recognition, for example in homes where only a few people are authorized and the system is capable of accurately recognizing those few.

The video processing unit 108 screens out and suppresses false alarms that Might otherwise be transmitted to the remote system 150. Thus, it can be determined at the premises whether an alarm event is potentially valid or false and, if the alarm event is determined to be false, an alarm is not ultimately generated. In situations, however, where the alarm event is determined to be real or the video processing unit 108 is uncertain, the captured video clip can be transmitted to the remote system 150, in some embodiments, with a prioritization level. Such a prioritization level is generally based upon predetermined criteria and usually includes a brief description of what a user (e.g., a security guard) at the remote system should consider in reviewing the transmitted information. The prioritization level based on such criteria may comprise a representation of a degree of difference between an image of the person (or object) and a template corresponding to an authorized person (or object). The prioritization level can help such a user rank the most likely alarm events as a higher priority for response as opposed to alarm events that appear to be less likely to be valid. For example, an unknown intruder might have a high priority whereas a door opening with no people present might warrant someone inspecting the situation but not on an immediate basis.

When the video processing unit 108 is unable to adequately match the captured images with the stored image templates, it can transmit a captured video clip of the person along with a list of possible matches. Such a list generally represents the best possible matches. Optionally, the remote system 150 can include an image database 152 that stores images of people that are authorized to be on the premises, in which case the image templates used at the local system 120 do not need to be sent to the remote system 150 each time video clips are transmitted for review. For example, names of authorized people that appear to be similar to the intruder can be sent to the remote system 150 and images corresponding to those names can be retrieved from the image database 152 and displayed (e.g., using a monitor 154) along with the transmitted video clip to allow for a user of the remote system to compare the images to the video clip. This method is advantageous because it reduces the amount of data to be transmitted from the local system 120 to the remote system 150 and it reduces the number of authorized people to be compared to the transmitted video clip. This is important in situations where there is a large list of people authorized to be on the premises. This method also provides for increased transmission speed, which can be significant in setups where communication takes place via a dialup connection.

In one example, in which door switches are used, video images are processed upon the opening of the door to see if someone was walking toward the door from the inside (if the camera is inside) or walking toward the door from the outside (if the camera is outside) before the door opened. The system can also analyze the video to determine whether someone was inside or outside the doorway after the door closed again.

In another example, in which motion detectors are used, video images are processed upon the detection of motion in the field of view, including the door, to see whether the first motion was the opening of the door or a person approaching the door. Instead of an external motion detector, a video camera whose images are being processed continuously can recognize motion to trigger detection of motion in the field of view. When a person is seen to be leaving the home or premises, any alarms that might normally be generated by the door opening or the motion sensors can be ignored. This eliminates a common cause of false alarms. The local system 120 can recognize the difference between animals, such as pets, and human beings or other common causes of video motion, such as lights and shadows. This is advantageous because, for example, stray light (e.g., headlights from a passing car or sunlight that is intermittently blocked by clouds) shining through the window could give an appearance that someone was on the inside near the door, if only simple video motion detection was used.

If all of the entryways to a premises are being monitored, a count of people entering and leaving can be kept. Thus, the local system 120 can keep track of when everyone has left the premises or whether someone is still on the premises. When everyone has left, the local system 120 can respond differently to intruders than if someone is still present. For example, if everyone has left then, except for people coming in through one of the entryways, no person should be detected indoors. If a person is detected indoors after everyone has left but no one came in through any of the entryways, then the local system 120 can determine this to be a break-in. However, if someone comes in through a door, or even if they approach a door from the outside, and someone is still home or on the premises, then the local system 120 might announce this by ringing a bell or sounding a buzzer to alert the person inside that someone is approaching or has just entered the house or premises. For example, a small store might ring a bell in the back to alert someone that a person has entered the front door, but if the last person has left for the day, then such an event would trigger an alarm.

Another advantageous feature that can significantly reduce the number of false alarms is the use in the system of an optional automated voice response function that can be performed in real-time. If someone enters the premises and the system is not sure whether this person is authorized, a prerecorded message can be played for the intruder. For example, the message might say: "Hello. This is the Protective Alarm Monitoring Center. Please state your name, followed by your passcode." The system then records any audio responses (e.g., using a microphone 106). In one configuration, the local system 120 simply records this response and sends it in with any alarm data and/or video data of the intruder that are transmitted to the remote system 150. The remote system 150 can use this information to facilitate verification of the alarm, saving the monitoring operator from having to call back the premises after an alarm has been received to verify it. In many cases, it is not feasible or even possible for an operator to call back after an alarm has been received because either someone is on the phone or the alarm system itself is occupying the phone line by sending more data, such as video data.

Another advantageous feature of the disclosed technology is the ability to perform voice pattern matching, or voice recognition, with use of a voice processing system to match the voice of the responder to a database of stored templates or voice tokens for authorized people. This can be compared to both the video templates stored and/or the passcode the person called out. This audio enunciation and listening can take place through a speaker (e.g., speaker 107 of FIG. 1) and microphone (e.g., microphone 106) mounted near the camera, or it can be accomplished by having the local system 120 ring the premises phones so that the person entering answers the phone. Over the phone the local system 120 can recite its voice message and listen to responses. The person could also enter a passcode through the phone keypad rather than by speaking a passcode.

Automated voice recognition further reduces alarms from being sent to central monitoring stations when they are false and makes a self-monitoring system even more practical. The functions of central monitoring stations to call back the premises after every alarm would be accomplished automatically before the alarm was even generated. This also saves embarrassing situations with the end-users who often accidentally cause false alarms. The local system 120, if unsure about a response (e.g., due to the lack of an appropriate match with what is stored in the database for authorized people), can also initiate further questions to facilitate verification. For example, the system could ask the person's birthday or middle name, providing more information for the voice recognition system to better identify him or her. This provides a significant deterrent to potential intruders since the local system 120 will be recording their images and voices. The local system 120 thus provides the additional benefit that it puts less pressure on a person to get their code right and to enter it within a limited time.

One configuration of the disclosed technology can eliminate the need for a keypad for the entering of codes to disarm the alarm system by using just video recognition, with audio recognition as a backup in situations where uncertainty exists. The person's clothing can be matched with what the person wore to work that day, for example. Alternatively, the person can use a keyfob transmitter to disarm the system with the touch of a button, and video recognition can be used to verify the person using the fob since each fob has a unique address.

With the exemplary system described herein, people can leave their home to go outside and get their newspaper or the mail, or go for a walk, and not have the worry about arming or disarming the system since the system would automatically remember their appearance as they left and know whether or not the premises is empty. Since a common cause of security system discontinuance is due to inconvenience and another common cause is the trouble with false alarms caused by inaccurately entering of the disarm code in the allotted time, the disclosed technology provides a much greater ease of use and improved protection to the person using it, while reducing false alarm signals and time spent at both central monitoring stations and the police force.

In view of the many possible embodiments to which the principles of the disclosed systems and methods may be applied, it should be recognized that the illustrated embodiments are only preferred examples and should not be taken as limiting in scope. Rather, the scope is defined by the following claims and all that comes within their scope and spirit.

I claim:

1. A security monitoring system, comprising:
    a local system configurable to be located at a first location and configurable to be electronically linked with a remote system at a second location to provide to the remote system indication of alarm events occurring at the first location, the second location being remote from the first location, the local system comprising:
    a local database on which are stored templates of data extracted from image data representing images of authorized objects; and
    an image processing system operable to compare a reduced image template representation of a local object with the stored templates and, if a matching result occurs from the comparison, to suppress indication of an alarm event to the remote system, and, if a non-matching or an inconclusive matching result occurs from the comparison, to transmit indication of an alarm event to the remote system.

2. The security monitoring system of claim 1, wherein the image processing system is further operable, if a matching result occurs from the comparison, to suppress transmission of an image of the local object from the local system to the remote system.

3. The security monitoring system of claim 1, wherein the indication of an alarm event to the remote system is a provisional determination subject to validation by the remote system.

4. The security monitoring system of claim 3, wherein the validation by the remote system comprises review of alarm event conditions by a human operator.

5. The security monitoring system of claim 4, wherein an image of the local object is transmitted from the local system to the remote system, and wherein the validation by the remote system comprises review of the image by a human operator at the second location.

6. The security monitoring system of claim 1, wherein the image processing system performs object recognition and background/foreground analysis on at least one image of the local object.

7. The security monitoring system of claim 6, wherein the comparison is performed in response to a determination by the analysis that the local object is a foreground object.

8. The security monitoring system of claim 1, wherein the remote system database is operable to electronically store an image corresponding to one of the authorized objects.

9. The security monitoring system of claim 1, wherein the image processing system is further operable, if the non-matching or inconclusive matching result occurs from the comparison, to transmit an image clip comprising one or more images of the local object to the remote system.

10. The security monitoring system of claim 9, wherein the remote system comprises a remote database on which are stored, for comparison with one or more images in the image clip, images of objects authorized for access to the local system.

11. The security monitoring system of claim 10, wherein the image processing system transmits along with the image clip prioritization information representing a degree of visual difference between one or more images in the image clip of the local object and the authorized objects templates stored on the local database, so that an operator of the remote system can compare one or more images in the image clip of the local object to most likely ones of the authorized objects whose images are stored on the remote database.

12. The security monitoring system of claim 1, wherein the image processing system is further operable, if the non-matching or inconclusive matching result occurs from the comparison, to transmit prioritization information indicative of urgency of the alarm event.

13. The security monitoring system of claim 1, wherein the local object and the authorized objects are human beings, wherein the local database is operable to electronically store a voice template corresponding to one of the authorized objects, and wherein the local system further comprises a voice verification system comprising:
 a device operable to capture a recording of a local object's voice;
 a voice processing system operable to perform an audio verification comprising an audio comparison of the recording of the local object's voice with the stored voice template and, if a matching result occurs, suppress transmission of the captured recording to the remote system.

14. The security monitoring system of claim 13, wherein the voice processing system is further operable, if the non-matching or inconclusive matching result occurs, to prompt the local object to make an oral statement, make an audio recording of the local object's oral statement, and transmit the audio recording to the remote system.

15. The security monitoring system of claim 14, wherein the voice processing system comprises a speaker through which the local object is prompted to make an oral statement and a microphone through which the local object makes the oral statement in response to the prompt.

16. The security monitoring system of claim 14, wherein the local system comprises a premises telephone and the voice processing system comprises a telephone actuator that rings the premises telephone to prompt the local object to make an oral statement and to transmit for capture as the recording the oral statement made in response to the prompt.

17. The security monitoring system of claim 1, wherein the local system is associated with premises having access locations through which local objects can enter or exit, and wherein the premises include a building, and further comprising a plurality of cameras mounted inside the building such that one of the cameras has a visual range directed toward a doorway providing access to the building.

18. The security monitoring system of claim 17, wherein the image processing system is further operable to determine whether the local object is entering or leaving the building through the doorway.

19. The security monitoring system of claim 17, wherein the stored templates comprise biometric features of the authorized objects.

20. The security monitoring system of claim 17, wherein the image processing system is further operable to maintain a count of how many local objects pass in or out the doorway during a given interval of time.

21. The security monitoring system of claim 17, wherein the matching result of the image processing system occurs from a comparison in which the local object is determined to be reentering the building within a predetermined time after leaving the building.

22. The security monitoring system of claim 1, wherein the local system is associated with premises having access locations through which local objects can enter or exit, and wherein the premises include a building, and further comprising a plurality of cameras mounted outside the building such that one of the cameras has a visual range directed away from a doorway providing access to the building.

23. The security monitoring system of claim 22, wherein the image processing system is further operable to determine whether the local object is entering or leaving the building through the doorway.

24. The security monitoring system of claim 22, wherein the stored templates comprise biometric features of the authorized objects.

25. The security monitoring system of claim 22, wherein the image processing system is further operable to maintain a count of how many local objects pass in or out the doorway during a given interval of time.

26. The security monitoring system of claim 22, wherein the matching result of the image processing system occurs from a comparison in which the local object is determined to be reentering the building within a predetermined time after leaving the building.

27. The security monitoring system of claim 1, wherein a non-matching result comprises a difference outside a predetermined range between the reduced image template representation of the local object and the stored templates of authorized objects.

28. The security monitoring system of claim 1, wherein the local system comprises a sensor operable to trigger the image processing system to perform the comparison.

29. The security monitoring system of claim 28, wherein the sensor comprises a motion sensor operable to detect a moving object.

30. The security monitoring system of claim 1, wherein the local and authorized objects have facial features, the reduced image template representation includes a representation of the facial features of the local object, and the stored templates of extracted data include representations of the facial features of the authorized objects.

31. The security monitoring system of claim 30, wherein:
the local system further comprises a locking system including access code storage for access codes corresponding to the authorized objects and including an access code entry device that receives, for comparison to the stored access codes, an access code entered by a local object seeking entry through one of the access locations; and
the locking system cooperates with the image processor to compare the stored image template of the local object who entered the access code with the reduced image template representation of the local object to determine whether a matching result occurs.

32. The security monitoring system of claim 31, wherein the access code entry device includes a keypad, a wireless transmitter, or an access control card.

33. A security monitoring system for premises having access locations through which objects can enter or exit and one of which includes a door, comprising:
a local system operable to determine an open or a closed state of the door, configurable to be located at a first location, and configurable to be electronically linked with a remote system at a second location to provide to the remote system indication of alarm events occurring at the first location, the second location being remote from the first location, the local system comprising:
a local database on which are stored templates of data extracted from image data representing images of authorized objects; and
an image processing system operable to compare a reduced image template representation of a local object with the stored templates and, if a matching result occurs from a comparison that represents a determination of presence of the local object within the premises before detection of an opening of the door, to suppress indication of an alarm event to the remote system, and, if a non-matching or an inconclusive matching result occurs from the comparison, to transmit indication of an alarm event to the remote system.

34. The security monitoring system of claim 33, wherein the door is operatively associated with a door sensor to determine the open or closed state of the door.

35. The security monitoring system of claim 33, wherein the image processing system determines the open or closed state of the door.

36. A security monitoring system for premises having a number of active access locations through which objects can enter or exit, comprising:
an alarm system operatively associated with the premises and comprising an image processor and a number of cameras in data communication with an image recognition unit;
a different one of the number of cameras being directed to capture images of objects entering or exiting each of the number of active access locations;
the image recognition unit having stored representations of objects authorized to be on the premises for comparison to the captured images; and
the image processor cooperating with the image recognition unit to compare reduced image template representations of the captured images to the stored representations of objects and thereby distinguish the objects entering and exiting the active access locations to establish alarm events that include a no alarm condition when one of the objects exits the premises through one of the active access locations.

37. The security monitoring system of claim 36, wherein the number of active access locations and the number of cameras is the same.

38. The security monitoring system of claim 36, wherein the no alarm condition further includes an occurrence of when one of the objects exits and reenters the premises within a preset period of time.

39. The security monitoring system of claim 38, wherein the objects have facial features and the cameras are directed to capture images of the facial features of the objects entering the active access locations.

40. The security monitoring system of claim 38, wherein the:
objects and the authorized objects have overall appearances;
the representations of the objects entering or exiting the active access locations include representations of the overall appearances of the objects;
the stored templates of extracted data include representations of the overall appearances of the authorized objects;
the cameras are directed to capture images of objects entering the active access locations; and
the image processor compares a reduced overall appearance image template of an object entering one of the active access locations with a reduced overall appearance image template of an object that previously exited one of the active access locations to establish a no alarm condition when the object entering one of the active access locations matches the object previously exiting one of the active access locations within an authorized reentry time.

41. The security monitoring system of claim 36, wherein the stored representations include templates corresponding to the objects authorized to be on the premises.

42. The security monitoring system of claim 36, wherein the alarm system is at a first location that is in proximity to the premises and produces an alarm signal indicative of an alarm condition and suppresses production of an alarm signal indicative of the no alarm condition, and further comprising:
a remote system at a second location that is remote from the first location, the remote system providing in response to the alarm signal an indication representing the alarm condition; and
a communication medium configured to convey the alarm signal from the alarm system to the remote system to provide at the remote system the indication representing the alarm condition.

43. The security monitoring system of claim 36, wherein the image recognition unit performs a count of the objects entering and exiting the number of active access locations, and in which the alarm events include first and second alarm conditions when an object unauthorized to be on the premises enters the premises that, as indicated by the count, are, respectively, unoccupied and occupied by an object authorized to be on the premises.

44. The security monitoring system of claim 43, wherein the alarm system is at a first location that is in proximity to the premises and produces first and second alarm signals indicative of the respective first and second alarm conditions, and further comprising:
a remote system at a second location that is remote from the first location, the remote system providing in response to the first and second alarm signals indications representing the respective first and second alarm conditions; and a communication medium configured to convey the first and second alarm signals from the alarm system to the remote system to provide the indications representing the respective first and second alarm conditions.

45. The security monitoring system of claim 43, wherein the alarm system is at a first location that is in proximity to the premises and produces a first alarm signal indicative of the first alarm condition, and further comprising:

a remote system at a second location that is remote from the first location, the remote system providing in response to the first alarm signal an indication representing the first alarm condition; and a communication medium configured to convey the first alarm signal from the alarm system to the remote system to provide the indication representing a first alarm condition.

46. The security monitoring system of claim 45, wherein the alarm system produces no alarm signal indicative of the second alarm condition.

47. The security monitoring system of claim 45, wherein the alarm system produces a second alarm signal indicative of the second alarm condition, the second alarm signal being a sound that is audible at the first location but not being conveyed to the remote system.

* * * * *